Nov. 15, 1949   F. B. MEECH   2,488,091
PHOTOGRAPHIC APPARATUS FOR PRODUCING SCALES,
DIAL FACES, AND THE LIKE
Filed Aug. 3, 1945   2 Sheets-Sheet 1
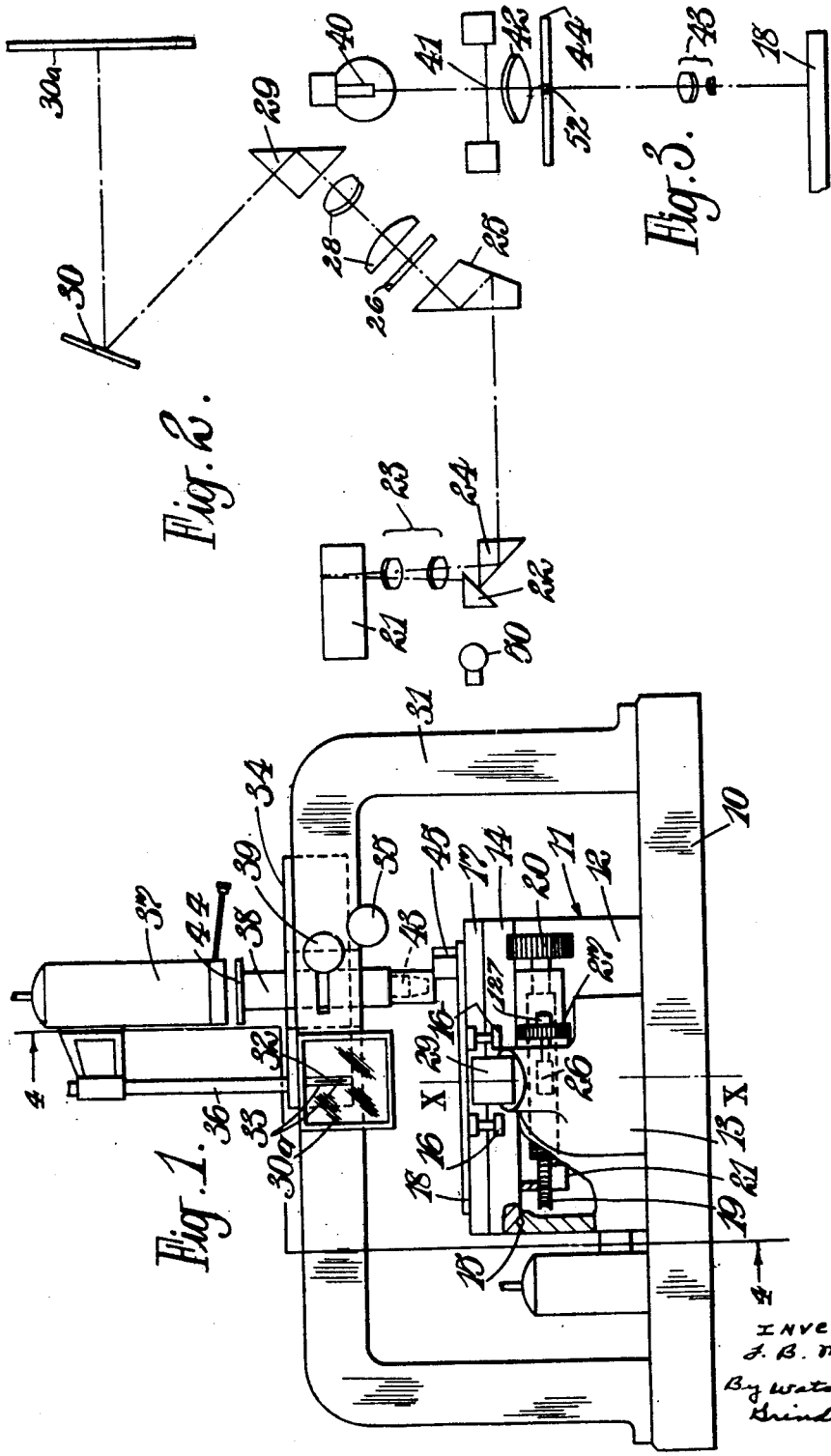

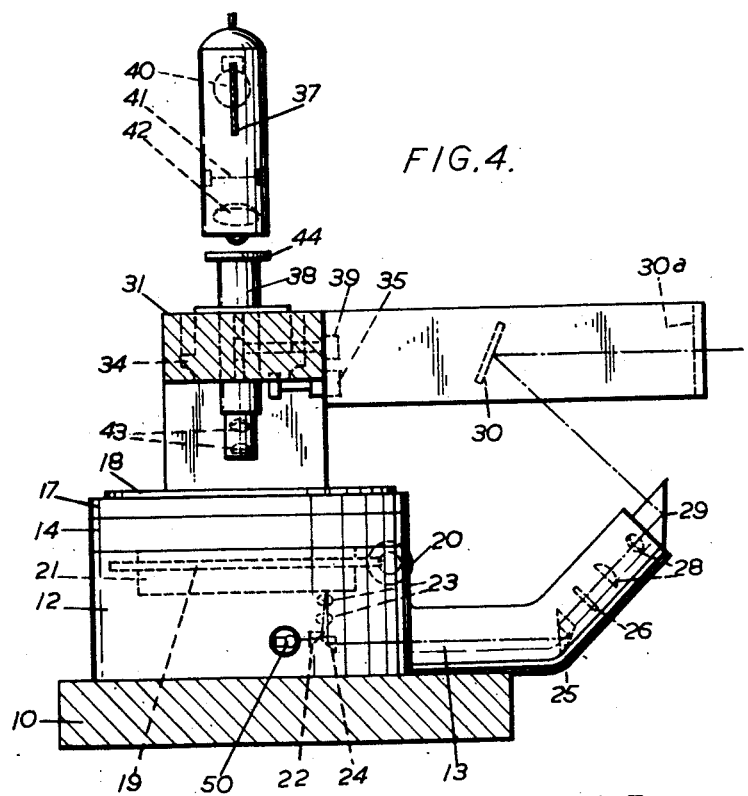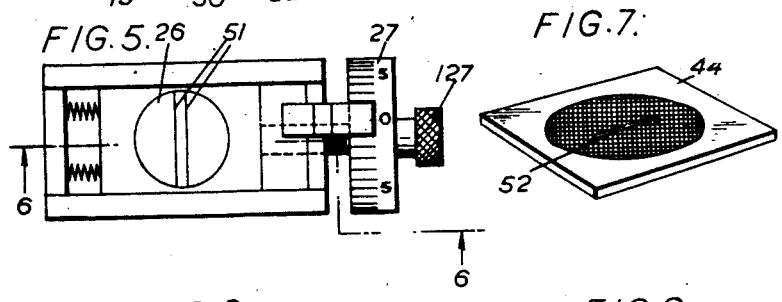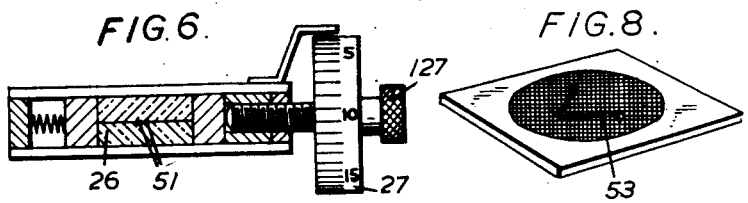

UNITED STATES PATENT OFFICE 2,488,091

PHOTOGRAPHIC APPARATUS FOR PRODUCING SCALES, DIAL FACES, AND THE LIKE

Frank Button Meech, Egham, England, assignor to Optical Measuring Tools Limited, Slough, England, a British company Application August 3, 1945, Serial No. 608,651
In Great Britain June 16, 1944

Section 1, Public Law 690, August 8, 1946
Patent expires June 16, 1964

3 Claims. (Cl. 88—24)

This invention comprises improvements in or relating to the photographic production of scales, dial faces and the like.

In producing an engine-divided scale by ordinary means an engraving tool makes each mark on the scale by executing a cutting movement and after each mark has been engraved the scale and engraving tool are shifted relatively to one another by the dividing engine over the necessary distance to bring the tool into position to make the next mark. When very fine lines are to be produced in certain materials, for example glass, in this way, it is difficult to produce a satisfactory scale. Also, scales produced in this way are liable to be imperfect owing to the cutting tip of the tool wearing as the work proceeds.

It has been proposed as an alternative to the use of a dividing engine to reproduce scales on glass photographically and this is widely done for short scales, such as micrometric scales for use in microscopes, but it is not possible to produce a lens which has sufficient definition over a wide field of view to reproduce with perfection a scale of substantial length, and especially is this the case when the lines to be produced are fine ones.

According to the present invention, in the production of engine-divided scales, the surface on which the scale is to be marked is rendered photosensitive and the marks upon the scale are produced by projecting an illuminated image of a mark on to the scale successively at the desired points where the marks are to occur, the image and the scale being shifted relatively to one another by dividing-engine mechanism between successive exposures. One advantage of this method of producing photographed scales is uniformity of line-thickness of the scales produced thereby.

The term "dividing-engine mechanism" is used herein in a broad sense and includes any mechanism which will serve to move a straight line or a circular scale successively through exact distances, whether automatically or with hand adjustment. It will be appreciated that while it is intended normally that a single mark should be produced at each exposure it is possible within the scope of the invention in suitable cases to expose successively an image of several marks which occur close together, but it is important in carrying out the invention to preserve one of its main advantages which is that the projected image lies in, or close to, the optical axis of the projecting mechanism and can therefore, without difficulty, be made extremely sharp so that a precise line is produced upon the scale by the photographic exposure.

The invention is of particular value in making circular scales on glass, for which purpose the glass may be mounted upon an optical dividing table beneath a mechanism for projecting a bright image of a fiine line on to a sensitised surface produced on the glass.

After production of a scale in the manner described the optical image may be fixed on the glass by known means, and further scales of equal accuracy may be obtained in any desired number by using the scale so produced on a glass plate to make a contact print on a second glass plate which when developed will serve as a negative. From this further scales can be produced by direct contact printing.

An apparatus for use according to the invention and the manner in which a scale can be produced by this apparatus will now be described, by way of example only, with reference to the accompanying drawings, in which:

Figure 1 is an elevation of the apparatus,

Figure 2 is a diagram showing the layout of the optical parts of a dividing table in the apparatus, Figure 3 is a diagram showing the layout of an optical projecting system in the apparatus, Figure 4 is a sectional view of the apparatus taken along line 4—4 of Figure 1, and Figures 5 to 8 show details of various optical parts of the apparatus illustrated in Figures 1 and 4, Figure 6 being a sectional view taken along line 6—6 of Figure 5.

The apparatus comprises a base 10 on which a dividing table is mounted. The dividing table can be a mechanical dividing table but it is preferred to employ an optical table as shown. The dividing table comprises a cylindrical casing 12 secured to the base 10 and having a lateral extension 13. A circular table 14 is mounted on top of the casing by a roller bearing 15 co-axially with the casing 12 and is located radially by a central pivot, not shown, to rotate about its own axis X—X. The table is provided with T-slots 16 and a false top 17 is secured to it by bolts passing through the false top and engaged in the T-slots. A sensitised plate 18 can be mounted on top of the false top 17 by suitable clips. The use of the false top allows of the plate 18 being loaded on to it away from the apparatus and afterwards being mounted on the table top 14. The table can be rotated by a conventional fine adjustment drive comprising a worm wheel 19 secured to the table top 14 and meshing with a worm which is rotated by a knob 20.

An annular glass ring 21 is secured to the bottom of the worm wheel and carries a graduated circular scale which has been tested and of which the corrections necessary to secure accurate reading of each graduation are known. The adjustment of the table is determined by the optical system shown diagrammatically in Figure 2 and Figure 4. This comprises a lamp 50 light from which is reflected by a 90° prism 22 through one half of an objective 23 on to the annular glass ring 21 which carries the scale on its upper surface which is also silvered. This illuminates a part of the scale and an image of the graduation of the scale is projected through the other half of the objective 23 and a 90° prism 24 on to a prism 25 which is disposed in the extension 13 of the casing. The image is projected into the plane of a graticule 26 best seen in Figures 5 and 6 which has two hair lines 51 extending parallel to the projected image of the graduation on the graduated scale. The graticule 26 is mounted to move at right angles to the length of the hair lines 51 in the extension 13 and is adjustable by a micrometer screw 27 (Figures 1, 5 and 6) which is provided with knurled head 127 and graduated in seconds of arc. A magnified image of the graticule and the line is projected by an eye-piece 28 and a prism 29 on to a mirror 30, and thence on to a screen 30ª of ground glass or the like. The mirror 30 is secured on a bridge 31 that is mounted on the base and extends over the dividing table.

This optical table provides a magnification in the order of 200 times to allow of the table being adjusted to within one second of arc. To adjust the table to a particular graduation on the graduated circular scale, the graticule 26 is adjusted by the micrometer screw in accordance with the known correction required for that graduation and the table top 14 is turned to bring the image 32 of the required graduation midway between the images 33 of the hair lines 51 on the screen 30a.

A slider 34 is mounted on the bridge-piece 31 to slide therealong over a diameter of the table top 14. Rack and pinion means operable by a knob 35 may be provided for adjusting the slider along the bridge-piece. The slider carries a pillar 36 which supports a projection lamp unit 37. The slider also carries a vertical tube 38 which is adjustable axially and vertically in the slider by rack and pinion means operated by a knob 39. The projection unit 37 contains a lamp 40 (Figures 3 and 4) from which light passes through a screen shutter 41 and an achromatic lens 42 in the bottom of the unit. The lens 42 condenses the light to form an image of the lamp filament on the back lens of a microscope objective 43 in the bottom of the tube 38. A screen 44 shown in perspective in Figure 7 is mounted on top of the tube 38 and is formed with a slit 52 which is approximately 0.07 inch long and 0.0004 inch wide and which extends radially of the table top 14. This arrangement projects an image of the slit 52 on to the sensitised plate 18 and it is essential that the image should be accurately focussed on the top face of the sensitised surface. The tube 38 must thus be adjusted to allow for variations in the thickness of the plate and the focussing is effected by placing a gauge 45 (Figure 1) on the plate and adjusting the tube 38 until its lower edge, which projects slightly beyond the objective 43, is in contact with the gauge.

To produce a scale, the slider 34 is moved along the bridge-piece 31 to a position at which the projected image of the slit will be located at the desired radius from the axis of the table 14. The table 14 is then turned to the first graduation on its circular scale 21, the shutter 41 is operated to expose the plate to the lamp 40 so that the image of the slit 52 of the screen 44 is formed on the plate. The exposure time must be arranged to suit the light available and the sensitivity of the plate, and is usually from one-fiftieth to one second. The table is then turned to the next graduation and the operation is repeated with the same exposure. The graticule 26 is adjusted, each time the table is adjusted, to apply the known correction to the graduation on the master scale to which the table is to be set. It will be seen that such exposure produces a latent graduation mark on the sensitised plate and when the plate has been exposed over a complete circle, it can be removed, developed and fixed. In this way a scale of exceedingly fine lines can be produced which are accurate to within any degree desired down to a few seconds of arc. Once a complete circular scale has been produced in this way, reproductions of this exceedingly accurate scale can be effected photographically by direct contact printing, preferably by light from a point source so that printed images are as sharp as the original.

Before the sensitised plate is exposed, it is preferred to normalise it by soaking it in distilled water for fifteen minutes and then in 90% industrial methylated spirits for fifteen minutes. After drying in one to two minutes it is mounted in the apparatus and exposed. It is also preferred to develop the exposed plate by the known reversal process to produce a negative having light graduations on a dark ground. This is desirable because the graduations, being the exposed part of the plate would be dark with normal development. The negative original plate can then be reproduced by printing on glass plates covered with a bichromated "process" glue, as used for photo-engraving. The prints are developed with warm water. The glue contains colloidal silver chloride which can be developed and intensified. After developing in water the plate is further treated with a photographic developer to blacken the silver and then with an intensifier solution to make it still blacker. The plate is finally baked at 250° C. so that the coating becomes enamelled firmly on to the glass.

A circular line may be formed on the sensitive plate by removing the screen 44 and replacing it by one containing a punch-hole aperture so that a point image is projected on to the sensitised plate. The plate is then rotated with the shutter 41 open so that the point image traces and exposes a circle on the plate.

The figuring of scales produced by this means may be effected by replacing the screen 44 by screens bearing the figures required. Alternatively, and more conveniently, a strip of 35 mm. cinema film could be prepared carrying numbers of such figures which are equally spaced by virtue of the perforations on the film, a conventional mechanical device being used to transport each successive number into the correct position for photographing.

In many instances it may also be desirable to produce with fine lines upon a scale a number of profile marks such as reproductions to a small size of the image of a section of a screwthread. These can be produced by replacing the screen 44 by one having a slit 53 (Fig. 8) of the shape of the screwthread so that an image of the shaped slit 53 is projected on to the sensitised plate. If a number of screens, each with a different size screwthread or other contour slit, are inserted one after another and exposed, the table being adjusted after each exposure, a series of contour screwthreads can be produced. It is proposed to make a drawing of the screwthread or other contour to a very large scale, for example 200 times full size. A number of negatives of various pitches are reproduced photographically from this one original and, after development are employed as the screens for projecting the various size screwthreads or other contours on to a circle in the present apparatus.

It will be appreciated that the projected image of the slit in the screen 44 is greatly reduced and therefore a slit which is of manageable width for reproduction purposes is reduced on the exposed plate to a very fine line. For example a slit of 1000th of an inch wide may be reproduced on the plate as a hair line 10,000th of an inch wide.

I claim:

1. Apparatus for producing accurately divided scales comprising in combination a movable table for a light sensitized scale-blank capable of supporting the blank in a position where movement of the table will advance the blank parallel to its sensitized surface, means for moving the said table under the control of an operator, a master-scale movable with the said table, an optical system for magnifying the said master-scale to the operator thereby enabling the table to be accurately pre-set in successive positions, a negative comprising an image of a fine line, a light source to illuminate said negative, a second optical system projecting a diminished image of the said fine line on to the scale-blank, said second optical system including a shutter for permitting or preventing as desired the exposure of said image of a fine line on the sensitized scale-blank.

2. Apparatus for producing accurately divided scales comprising in combination a movable table for a light sensitized scale-blank capable of supporting the blank in a position where movement of the table will advance the blank parallel to its sensitized surface, means for moving the table under the control of an operator, a master-scale movable with the table, an optical system for magnifying the master-scale to the operator thereby enabling the table to be accurately pre-set in successive positions, an adjustable index against which said master-scale is moved by the aid of the said optical system, means whereby the operator can set the said index to correct errors in the said master-scale, a negative comprising an image of a fine line, a light source to illuminate said negative, a second optical system projecting a diminished image of the fine line on to the scale-blank, said second optical system including a shutter for permitting or preventing as desired the exposure of the said image of a fine line on the sensitized scale-blank.

3. Apparatus as claimed in claim 1 wherein the table is rotatable about a stationary axis so that the scale produced is circular, and wherein the negative and the second optical system are movable as a unit relatively to said axis along the radius of the scale.

FRANK BUTTON MEECH.

REFERENCES CITED

The following references are of record in the file of this patent:

UNITED STATES PATENTS

| Number | Name | Date |
| --- | --- | --- |
| 1,034,192 | Brown | July 30, 1912 |
| 1,391,859 | Schulze | Sept. 27, 1921 |
| 1,588,221 | Bauerfeld | June 8, 1926 |
| 1,975,439 | Uher | Oct. 2, 1934 |
| 2,266,287 | Thom | Dec. 16, 1941 |
| 2,275,977 | Means et al. | Mar. 10, 1942 |
| 2,300,803 | Pattee | Nov. 3, 1942 |

FOREIGN PATENTS

| Number | Country | Date |
| --- | --- | --- |
| 587,591 | Germany | Nov. 6, 1933 |